United States Patent [19]

Powell

[11] Patent Number: 5,182,874

[45] Date of Patent: Feb. 2, 1993

[54] FISHING LINE CUTTER, AND ROD AND REEL THEREWITH

[76] Inventor: Timothy R. Powell, 2626 40th Ave. North, Texas City, Tex. 77590

[21] Appl. No.: 685,538

[22] Filed: Apr. 15, 1991

Related U.S. Application Data

[63] Continuation-in-part of Ser. No. 453,823, Dec. 21, 1989, Pat. No. 5,025,585.

[51] Int. Cl.⁵ .................................................. A01K 87/00
[52] U.S. Cl. ........................................... 43/25; 30/286
[58] Field of Search ................ 43/25; 242/323; 225/6; 30/278, 280, 286, 2

[56] References Cited

U.S. PATENT DOCUMENTS

| | | | |
|---|---|---|---|
| 1,851,370 | 3/1932 | Munger | 43/25 |
| 2,171,050 | 8/1939 | Slawson | 30/317 |
| 3,128,023 | 4/1964 | Cook | 225/19 |
| 3,781,988 | 1/1974 | Jones | 30/2 |
| 4,023,299 | 5/1977 | Maserang et al. | 43/25 |
| 4,216,921 | 8/1980 | Puryear | 242/323 |
| 4,711,031 | 12/1987 | Annello | 30/294 |
| 4,726,140 | 2/1988 | Mears | 43/25 |
| 4,730,409 | 3/1988 | Mitchell et al. | 43/25 |
| 4,744,146 | 5/1988 | Schmidt | 30/162 |
| 4,823,498 | 4/1989 | Banta | 43/25 |
| 4,896,422 | 1/1990 | Sheehan et al. | 30/290 |
| 5,025,585 | 6/1991 | Powell | 43/25 |

FOREIGN PATENT DOCUMENTS

463963 3/1950 Canada ................................. 43/25

Primary Examiner—Richard K. Seidel
Assistant Examiner—James Miner
Attorney, Agent, or Firm—Guy McClung

[57] ABSTRACT

A fishing line cutter, a fishing rod with a fishing line cutter, and a fishing reel with a fishing line cutter; and in various embodiments; a fishing line cutter with a body, a sharp edged member for cutting line mounted to the body, and a plurality of fingers extending from the body to facilitate attaching the cutter to a fishing rod; a line cutter with dual opposed cutting edges; a line cutter with a shield movable to expose a cutting blade; a line cutter with a retractable blade; a line cutter with overlapping protective fingers past which a line passes prior to cutting; a line cutter with part of a body member movable to permit blade replacement; and in one aspect, a fishing line cutter with obstructions for partially blocking an opening in which a line cutting blade is exposed to inhibit or prevent inadvertent entry of the line into the opening or inadvertent entry of a device (such as an O-ring) into the opening, which device is used to secure the cutter to something, e.g., a rod or reel; and a rod or a reel with one of such cutters.

5 Claims, 6 Drawing Sheets

FISHING LINE CUTTER, AND ROD AND REEL THEREWITH

RELATED APPLICATION

This is a continuation-in-part of U.S. patent application Ser. No. 07/453,823 filed on Dec. 21, 1989 entitled "Fishing Line Cutter" now U.S. Pat. No. 5,025,508.

BACKGROUND OF THE INVENTION

1. Field Of The Invention

This invention is directed to fishing rods and reels and to fishing line cutters. In one particular embodiment, it is directed to a fishing line cutter which is removably attachable to a fishing rod; and to a rod or reel with such a cutter. In another particular embodiment, it is directed to such a cutter which is easily attachable without severing its attachment apparatus and which inhibits inadvertent line cutting.

2. Description Of Related Art

The prior art discloses a variety of fishing line cutters which have a blade or blades for cutting a line and which are removably attachable to a fishing rod. Line cutters attachable to fishing reels are also disclosed in the prior art. Although the prior art teaches line cutters which are removably attachable to a fishing rod, there is no teaching of which the Applicant for this patent is aware of a line cutter which is secured to a rod with a single O-ring; nor does the prior art recognize any problem associated with severing such an O-ring while securing such a line cutter to a rod or any problem associated with correct O-ring positioning. Having failed to recognize these problems, the prior art does not address them or solve them. Also, the prior art does not recognize or address any problems associated with inadvertent and undesirable line cutting done in error.

The following prior art is disclosed: U.S. Pat. No(s). 2,171,050; 3,128,023; 4,726,140; 4,730,409; 4,823,498; 1,851,370; 3,781,988; 4,711,031; 4,744,146; 4,896,422; 4,023,299; and Canada No. 0,463,963.

There has long been a need for an effective and efficient rod-mountable fishing line cutter. There has long been a need for such a cutter which is quickly removable from a rod. There has long been a need for a fishing line cutter which can be used safely, minimizing the chance of injury to the user. There is a need for a line cutter which inhibits or prevents unwanted severing of a fishing line and unwanted severing of an O-ring used to attach a line cutter to a rod or other item.

SUMMARY OF THE PRESENT INVENTION

The present invention is directed to a fishing line cutter. In one embodiment, a fishing line cutter according to this invention has a body member to which is mounted an implement with a sharp edge or edges for cutting fishing line, the body member having projections thereon for facilitating the mounting of the cutter on a fishing rod, the cutting edge or edges protected by some type of shield means. Other embodiments of fishing line cutters according to the present invention include a variety of other features in addition to the various embodiments mentioned here.

In another embodiment of a fishing line cutter according to the present invention, the cutter has a body which may be formed with a mounting member that corresponds in shape to the circular surface of a rod, the body extending from the mounting member and having one or more notches therein for receiving and holding an O-ring used to attach the cutter to the rod, with a blade mounted in the body so that a fishing line inserted through an opening in the body is movable to contact the blade for cutting the line. Such a cutter may have a body member with an extended portion that extends in front of the opening to inhibit the unwanted entry of the fishing line into the opening as well as the undesired entry of the O-ring during the attachment operation. In another embodiment, a ridge may be disposed on the body member interiorly of the opening to accomplish either or both of these goals. A notch, hole or holes may be provided in the body member for receiving and holding a hook. To secure the blade in place in such a cutter, a blade may be used which has an opening therein through which plastic may flow and set during a molding operation or for receiving another member, e.g. a bolt, to secure the blade.

In one embodiment of the present invention, a fishing rod is provided which has a fishing line cutter (according to this invention as disclosed herein) formed integrally of a portion of the rod or removably secured to the rod. In a particular embodiment of a rod according to the present invention, the rod has an elongated rod member with a fishing line cutter secured thereto with an O-ring, the fishing line cutter having a body member mountable to the rod and a base with two sides and two ends, the O-ring wrapped about one side of the base, around the rod, and about the other side of the base, with a cutting member attached to the body member for cutting the line. Another fishing rod according to the present invention has an elongated rod member with a fishing line cutter on the rod member, the fishing line cutter having a body and a cutting member exposed in an opening in the body, the line passable into the opening for cutting, and a lip extending from the body to partially block the opening to inhibit or prevent inadvertent entry of the line into the opening. In another embodiment of such a rod, the lip also inhibits or prevents entry of the O-ring into the opening.

In one embodiment, a fishing reel according to the present invention has a reel body, a reeling mechanism on the reel body for reeling fishing line, an exterior handle engaging the reeling mechanism for operating the reeling mechanism, and a fishing line cutter on the reel body, the line cutter having a body with a cutting member attached thereto and a portion of the cutting member exposed in an opening in the body, the line entering through the opening to contact the cutting member, and at least one lip extending from the body and partially blocking the opening to inhibit or prevent the inadvertent entry of the line into the opening; or in another embodiment, such a reel in which the line cutter is removably secured to a portion of the reel (secured as previously described for securement to a rod) and the lip or lips inhibiting or preventing the O-ring from entering the opening.

At least certain preferred embodiments of the present invention, therefore, seek to provide new, useful, safe, unique, efficient, and nonobvious: fishing line cutters and rods and reels with them; methods and means for making them; and methods and means for removably attaching them to another item.

DESCRIPTION OF THE DRAWINGS

FIG. 20b is a rear view of the cutter of FIG. 20a.

FIG. 20c is a front view of the cuter of FIG. 20a.

DESCRIPTION OF EMBODIMENTS PREFERRED AT THE TIME OF FILING FOR THIS PATENT

Figure 1:
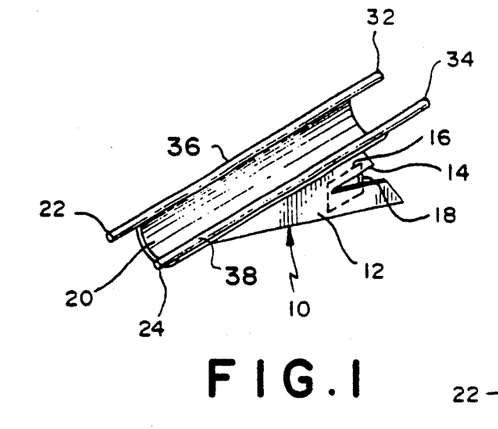
FIG. 1 is a perspective view of a fishing line cutter according to the present invention.

As shown in FIG. 1, a fishing line cutter 10 according to the present invention has a body member 12. The body member 12 has a curved member 20 connected thereto which conveniently lies against a fishing rod. A blade 16 with a sharp edge 18 is mounted in the body member 12 and notch 14 in the body member 12 exposes the blade's sharp edge. The notch 14 is in one end of the body member 12. Rods 36, 38 are connected to the curved member 20. Finger projections 22, 24, 32, 34 extend from the rods 36, 38 curved member 20 and provide means to which a strap (e.g. string, fish line, elastic band, surgical tube) can be connected to attached the cutter 10 to a rod.

Figure 2:
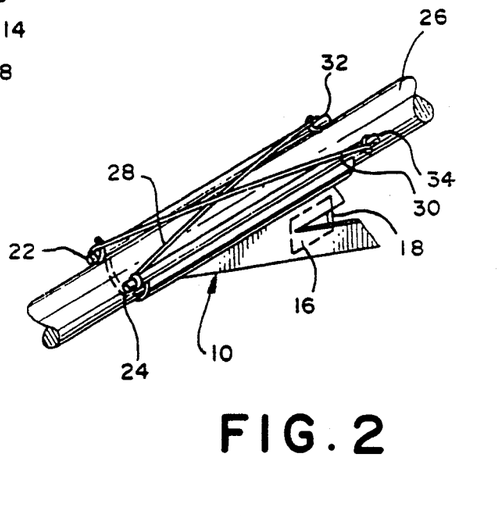
FIG. 2 shows the cutter of FIG. 1 on a fishing rod.

As shown in FIG. 2, the fishing line cutter 10 is attached to a fishing rod 26. The curved member 20 is emplaced against the rod 26. Strap means such a surgical rubber tubes 28, 30 are tied or connected across the rod by means of the finger projections 24, 32 (tube 28) and 22, 34 (tube 30).

Since the notch 14 is at one end of the cutter 10, when the cutter is positioned on a rod so that the notch faces forwardly a line from the rod tip can be placed around the cutter with the line on the notch and a rearward pull on the line will cut the line.

Figures 3, 4, 5:
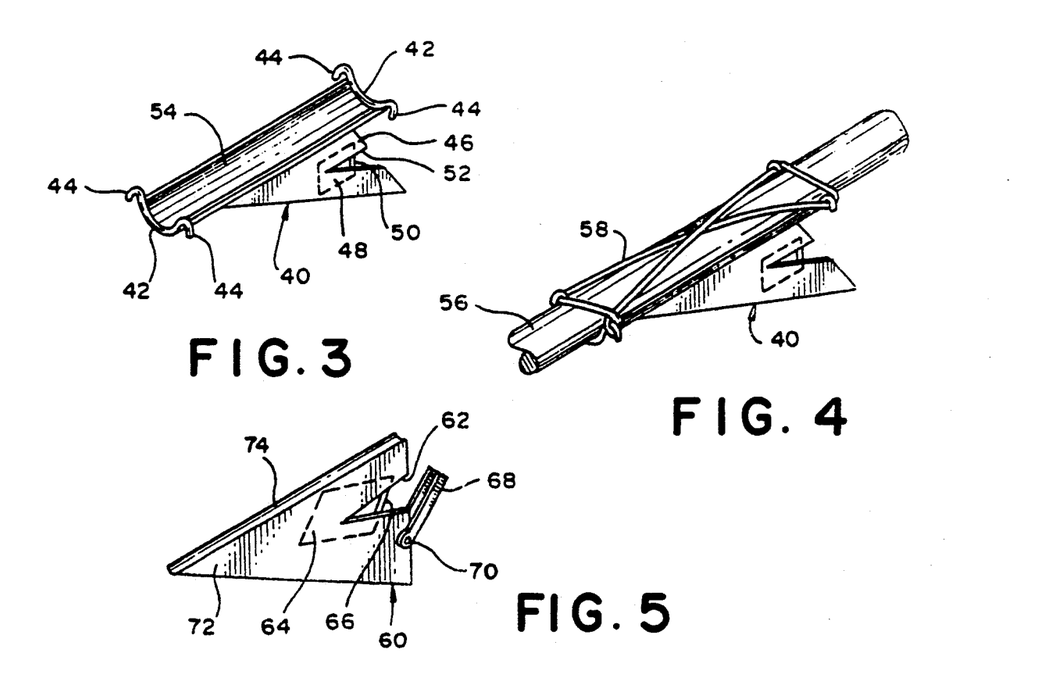
FIG. 3 is a perspective view of a fishing line cutter according to the present invention.
FIG. 4 shows the cutter of FIG. 3 on a rod.
FIG. 5 is a perspective view partially cutaway of a fishing line cutter according to the present invention.

As shown in FIG. 3, a fishing line cutter 40 according to the present invention has indented members 42 with projections 44 which permit connection of the cutter 40 to a rod. The cutter 40 has a body 46, a blade 48 with a sharp edge 50 exposed in a notch 52, and a curved member 54. As shown in FIG. 4, the cutter 40 is attached to a rod 56 by an elastic band 58 which crosses between and engages the projections 44.

A cutter 60 illustrated in FIG. 5 has a body member 72 with a curved member 74 for emplacement against a rod body. The cutter 60 may be glued to a rod with a suitable adhesive or Velcro (TM) or other connection means described herein may be added to it. A notch in the body member 72 exposes a sharp edge 66 of a blade 64 mounted to the body member 72. The blade may be mounted on the side of or within the body member 72. A cover or shield 68 is movably disposed so that it can close off the opening of the notch 62 thereby preventing access to the sharp edge 66 of the blade 64. The cover 68 pivots about pivot 70 extending through the body member 72.

Figures 6, 7, 8, 9, 10:
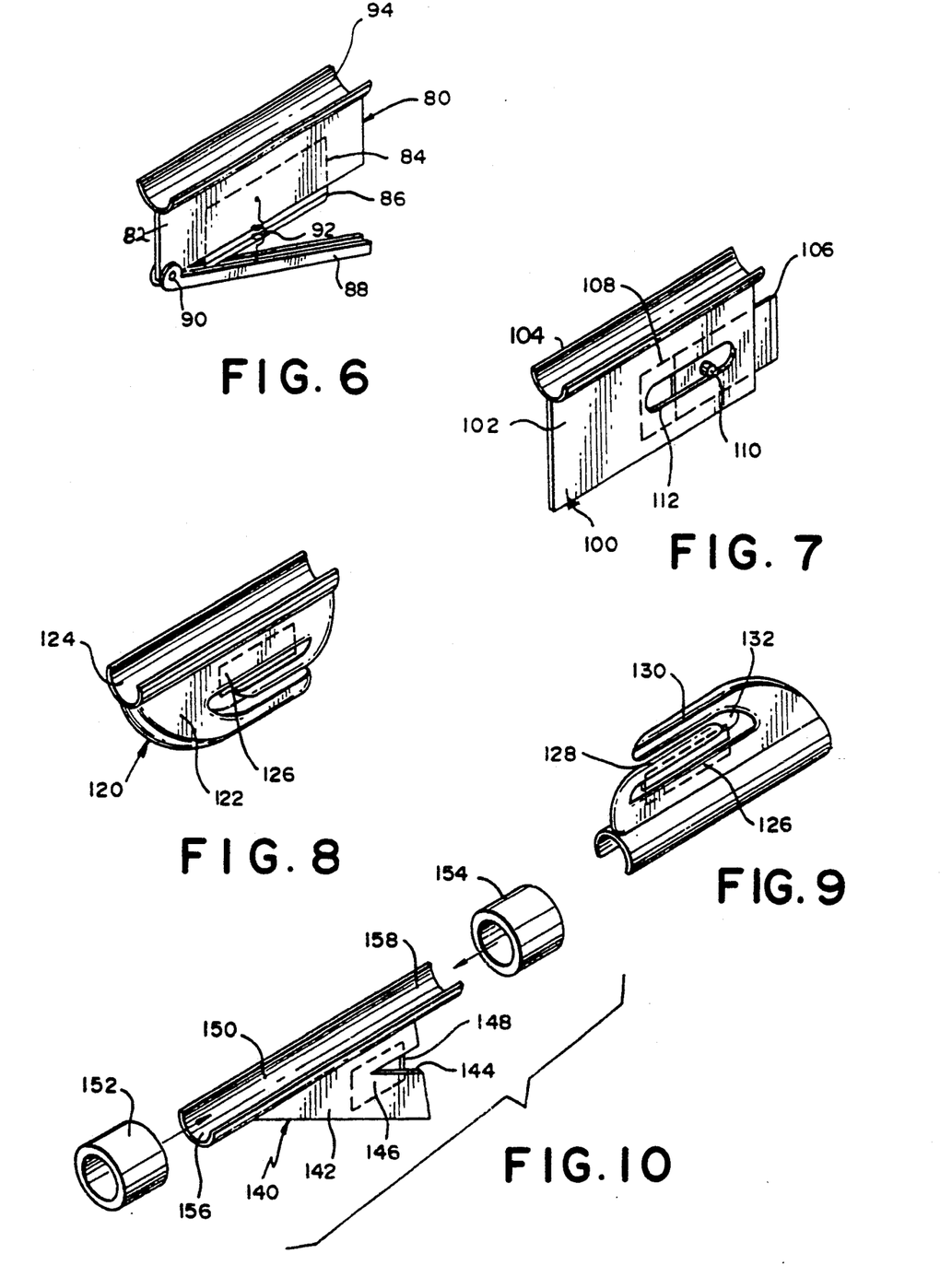
FIG. 6 is a perspective view partially cutaway of a fishing line cutter according to the present invention.
FIG. 7 is a perspective view partially cutaway of a fishing line cutter according to the present invention.
FIG. 8 is a perspective view partially cutaway of a fishing line cutter according to the present invention.
FIG. 9 is a partial side view in cross-section of the cutter of FIG. 8.
FIG. 10 is a perspective view partially cutaway of a fishing line cutter according to the present invention.

As shown in FIG. 6, a cutter 80 has a body 82 and a blade 84 with a sharp edge 86 mounted to it. A shield 88 is pivotably mounted at pivot 90 to the body 82. A spring 92 is connected to and between the shield 88 against the body 82 so that the shield 88 stays in position against the edge 86 when the cutter 80 is not in use. A curved member 94 facilitates emplacement of the cutter 80 on a fishing rod.

A cutter 100 shown in FIG. 7 has a body 102 and a curved member 104. A blade 106 is movably disposed on or in (preferably in) a recess 108 in the body 102. A pin 110 on the blade 106 which extends out through a recess 112 in the body 102 facilitates movement of the blade 106.

A cutter 120 shown in FIG. 8 according to the present invention has a body 122 and a curved member 124. The curved member 124 is fashioned so that when made of appropriate material, e.g. rubber or plastic, it can clip onto a rod. This feature may be incorporated to other cutters disclosed herein.

The cutter 120 has a blade 126 mounted therein for cutting fishing line. Adjacent the blade 126 is a protective finger 128 connected to the body 122 which is spaced apart from the blade 126. As shown in FIG. 9, adjacent the finger 128 is another finger 130 connected to the body 122 which overlaps the finger 128 so that line may be moved through a pathway 132 between the fingers 128, 130, but an angler's fingers will not touch the blade 126. This arrangement also permits the line to be pulled between the blade 126 and the finger 128 where tension can then be applied to the line to facilitate in cutting it.

As shown in FIG. 10, a cutter 140 has a body 142, a curved member 150, and a notch 144 in which is exposed a sharp portion 148 of a blade 146. Ends 156, 158 of the curved member 150 project sufficiently that pieces of tubing (e.g. rubber, elastic) can be fitted over them to connect the cutter 140 to a rod 160 as shown in FIG. 11.

Figures 11, 12, 13, 14, 15:
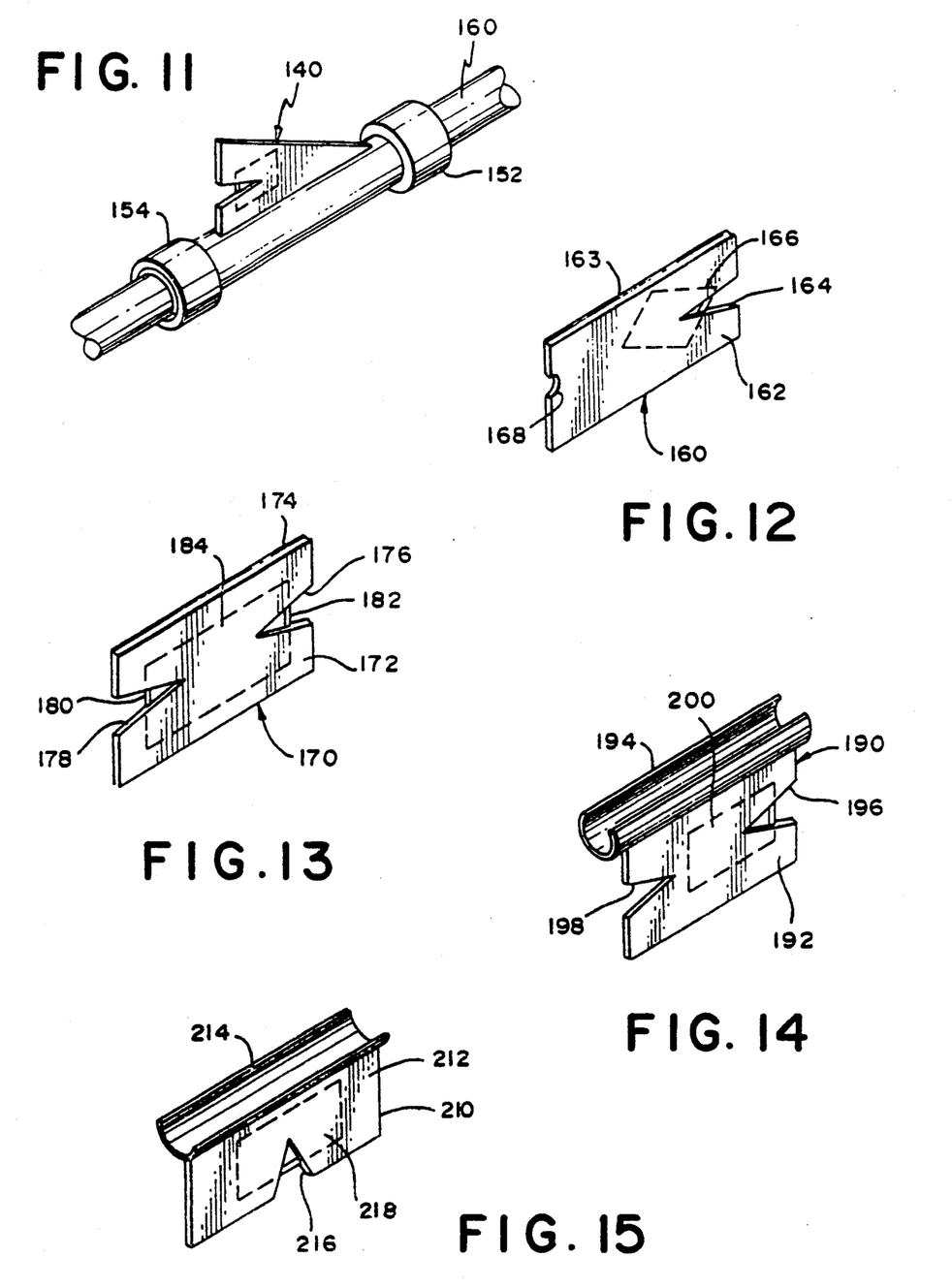
FIG. 11 is a perspective view of the cutter of FIG. 10 on a rod.
FIG. 12 is a perspective view partially cutaway of a fishing line cutter according to the present invention.
FIG. 13 is a perspective view partially cutaway of a fishing line cutter according to the present invention.
FIG. 14 is a perspective view partially cutaway of a fishing line cutter according to the present invention.
FIG. 15 is a perspective view partially cutaway of a fishing line cutter according to the present invention.

As shown in FIG. 12, a cutter 160 with a body 162, a curved member 163, and a notch 164 in which is exposed a blade 166, has a recess 168 in which a hook may be emplaced.

As shown in FIG. 13, a cutter 170 has a body 172, a curved member 174, and dual opposed notches 176, 178 in which are exposed dual opposed sharp edges 180, 182 of a blade 184 mounted in the body 172. Of course two separate blades could be used in this embodiment.

As shown in FIG. 14, a cutter 190 has a body 192, a curved member 194 (like the curved member 124, FIG. 8), notches 196, 198, and a blade 200 mounted in the body 192 so that it is exposed in the notch 196. Line may be pulled into notch 198 and then into notch 196 to increase tension on it for facilitating in cutting the line.

As shown in FIG. 15, a cutter 210 has a body 212, a curved member 214, and a notch 216 in the bottom of the body 212 in which is exposed a portion of a blade 218. The positioning of the notch 216 allows line to be cut with an upward (mounted on a rod bottom) or downward (mounted on top of a rod) movement of the line.

Figure 16:
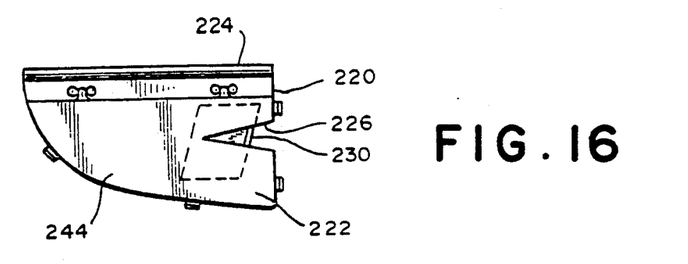
FIG. 16 is a side perspective view of a fishing line cutter according to the present invention.
Figures 17, 18, 19:
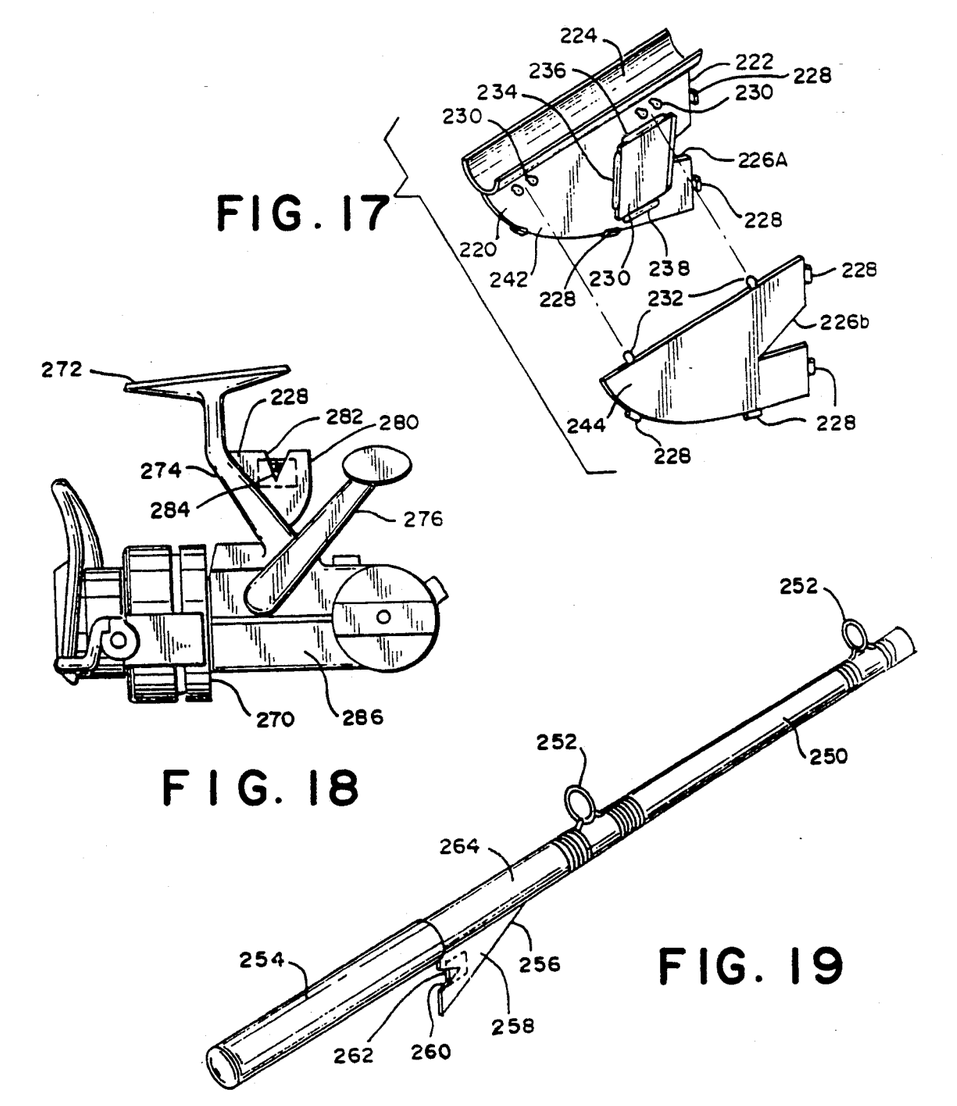
FIG. 17 is another view of the cutter of FIG. 16 showing one shield piece removed.
FIG. 18 is a side perspective view of a reel according to the present invention.
FIG. 19 is a perspective view of a rod according to the present invention.

As shown in FIGS. 16 and 17, a fishing line cutter 220 according to the present invention has a body 222 with a descending body side member 242 and a body side member 244 corresponding to the member 242 is disconnectably attached to the body member 242 by means of a plurality of interengaging snaps 228 spaced around the periphery of the body side members and by means of one or more hinges 230 on the body member which engage by a snap fit buttons 232 on the member 244. Body side member 242 has a notch 226a corresponding to a notch 226b in body side member 244. A blade 230 is exposed in the notch 226a/226b and is held in place by the body side members and by ridges 234, 236, 238 on member 242. Removal of the body side member 244 permits blade replacement.

Fishing line cutters according to the present invention can be connected to or formed integrally of either a fishing rod or a fishing reel on a convenient part of the rod or reel as desired.

As shown in FIG. 18, a fishing reel 270 according to the present invention has a reel mounting base 272 with a base extension member 274 extending therefrom and disposed between the base 272 and a reel body 286. A typical reeling mechanism (not shown) is disposed within the reel body and an exterior handle 276 engages the reeling mechanism for retrieving fishing line. The reel 270 is an open faced spinning reel, but the present invention contemplates all other types of fishing reels, including but not limited to baitcasting reels, trolling reels, and closed-face spincasting reels. A fishing line cutter 228 is formed integrally of or attached to the base extension 274 and has a body 280 with a notch 282 in which is exposed a sharp portion of a blade 284 which is mounted within the body 280. Although the fishing line cutter is shown on the base extension, it is within the scope of this invention for the cutter to be located on any convenient part of a reel, such as, but not limited to, the covering case of a closed-face spincasting reel or in an indentation in it. Also, it is within the scope of this invention to provide a reel with any of the variety of cutters disclosed or described herein, including, but not limited to, the described preferred embodiments.

As shown in FIG. 19, a fishing rod 250 according to the present invention has an elongated rod member 264 to which are attached a plurality of eyelets 252 for guiding fishing line. At one end of the rod 250 is a handle portion 254. Formed integrally of the rod 250 or attached to it is a fishing line cutter 256 which has a body 258 with a notch 260 therein that exposes a sharp portion of a blade 262. It is within the scope of this invention for the fishing line cutter to be located at any convenient point on a rod and for any type of fishing line cutter within the scope of this invention to be employed.

Figure 20A:
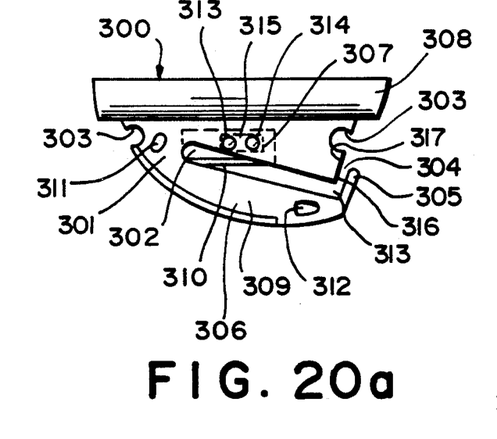
FIG. 20a is a side view of a fishing line cutter according to the present invention.
Figure 20B:
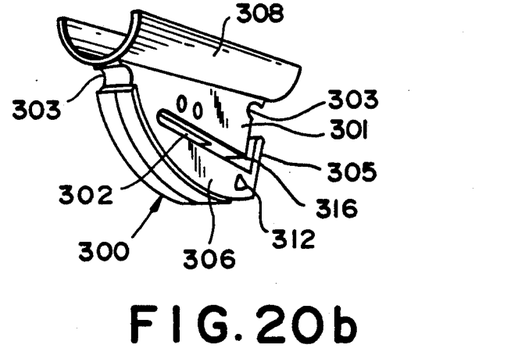
Figure 20C:
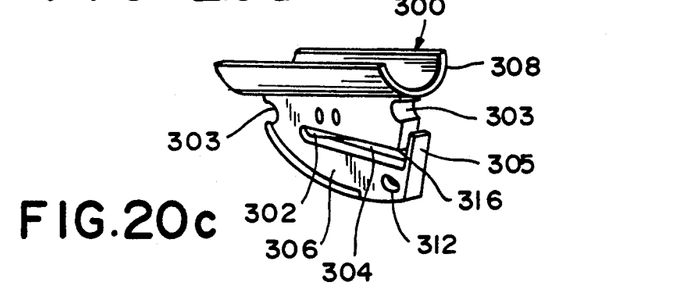

A fishing line cutter 300 according to the present invention as shown in FIGS. 20a, b and c has a body 301 with notches 303 therein for receiving an O-ring (not shown) which wraps around a fishing rod or other item (not shown) and back around the cutter 300 to hold the cutter 300 on the rod. A mount member 308 extends from the body 301 and is formed with a shape that is semi-circular in cross-section to conform to the shape of the rod or other item for easier and more secure mounting of the cutter. A blade 302 has a cutting edge 310 which is exposed in a recess 309 in the body 301 for cutting the line. A lip 305 extends from a finger 306 of the body 301 completely past an edge 316 of the body 301 at an opening 313 of the recess 309 to inhibit or prevent line from inadvertently entering the opening 313 and moving to contact the cutting edge 310 of the blade 302. The lip 305 also inhibits or prevents the O-ring from entering into the recess 309 and being inadvertently cut by the blade 302 during securement of the cutter to a rod or other item. Holes such as holes 311 and 312 may be provided through the cutter for receiving and removably holding a hook or part of a swivel. The blade 302 has an opening or cut-out portion 307 through which and in which is disposed part of the body (e.g. an amount of hardened plastic) 315 which helps to secure the blade 302 within the body 301 and facilitates a molding operation to produce the cutter 300. Holes 313 and 314 receive parts of a mold for such an operation. Alternatively, a bolt screw or other member is insertable through the opening 307 to secure the blade.

A channel 304 is defined by a portion 317 of the body 301 and a portion of the lip 305. The channel 304 is at an angle to (i.e. is not aligned with) the recess 309 and a line or O-ring has to turn a corner at the edge 316 on its way to contact the cutting edge 310. The lip 305 therefore prevents direct entry of a line or O-ring into the opening 313. By sizing the channel 304, an O-ring will not simply be inhibited from moving therethrough, it will be prevented from moving therethrough; yet the channel will still permit fishing line of a lesser diameter, when desired, to pass through the channel 304, through the opening 313, and into the recess 309.

Figure 21:
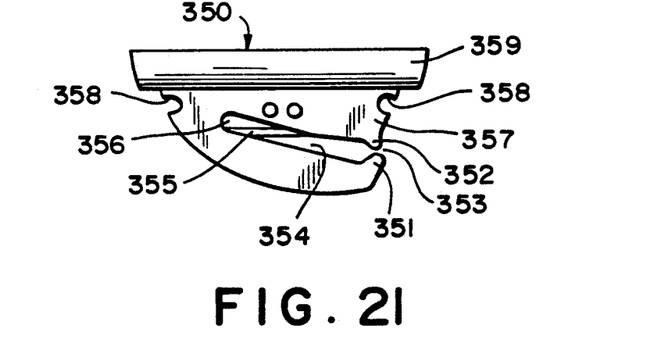
FIG. 21 is a side view of a fishing line cutter according to the present invention.

FIG. 21 shows a line cutter 350 according to the present invention which is like the line cutter 300 (FIG. 20) but which does not have the lip 305. The cutter 350 has opposed lips 351 and 352 which reduce the size of an opening 353 to inhibit or prevent fishing line or an O-ring from passing through the opening 353, through an opening 354, and to a cutting edge 355 of a blade 356 mounted within a body 357 of the cutter 350. Notches 358 facilitate emplacement of an O-ring around the cutter 350 and around a rod or other item to which the cutter is attached. Mount member 359 of the body 357 is like the member 308 (FIG. 20).

Figure 22:
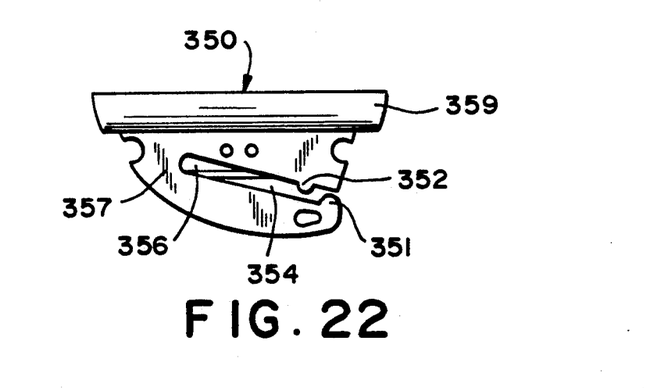
FIG. 22 is a side view of a fishing line cutter according to the present invention.
Figure 23A:
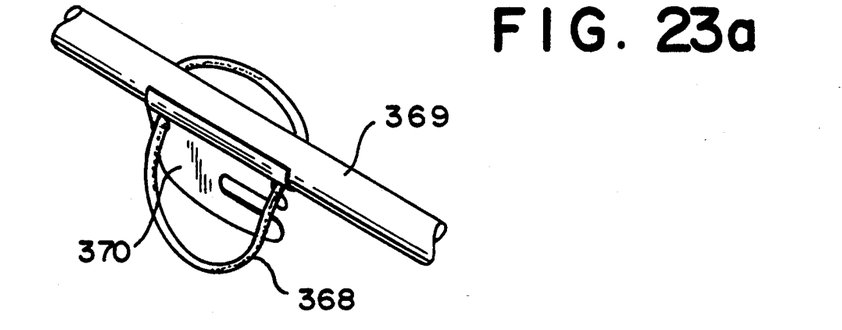
FIGS. 23a, b, c, d illustrate securement of a line cutter to a rod according to the present invention.
Figure 23B:
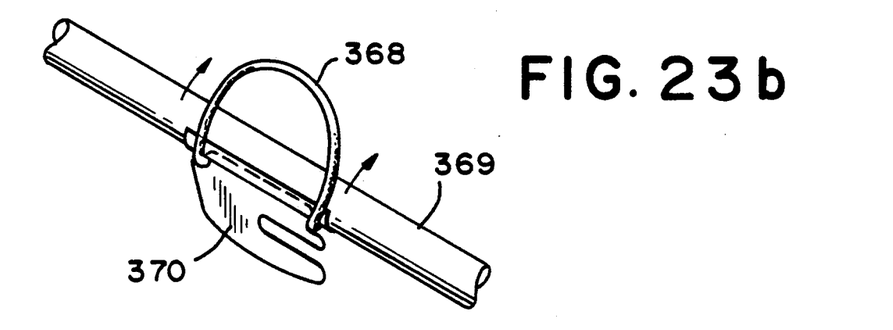
Figure 23C:
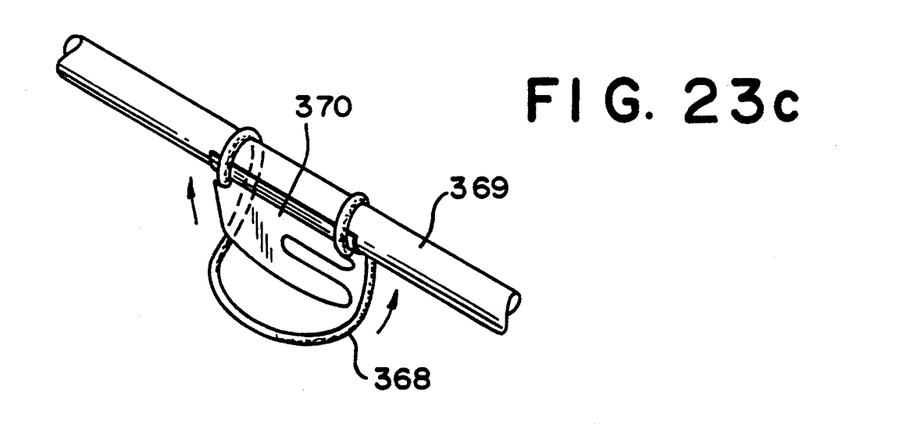
Figure 23D:
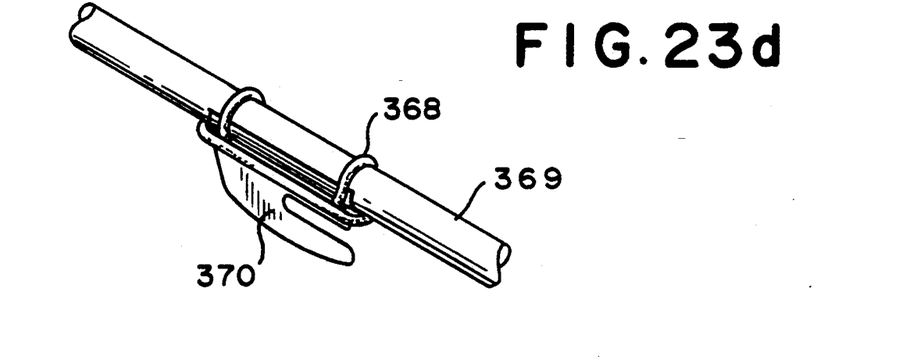

FIG. 22 shows another embodiment of the cutter 350 in which the lip 352 is moved toward the blade 356. It is within the scope of this invention to provide a cutter with more than two such lips and to position them as desired about the opening 354.

FIGS. 23 a, b, c and d illustrate the use of an O-ring 368 to removably secure a line cutter 370 to a rod 369. In FIG. 23a, the line cutter 370 is placed against the rod 369 and the O-ring 368 is positioned about the line cutter as shown. FIG. 23b shows the O-ring 368 pulled tight around the cutter 370 and beginning to pass over the rod 369 as indicated by the arrows. FIGS. 23c shows the O-ring encircling the rod and heading back over the cutter 370. FIG. 23d shows the O-ring 368 finally in place tight around the rod 369 and tight around the cutter 370. Thus, the O-ring initially wraps about one side of the line cutter and, if it has a notch or notches in a base thereof, a portion of the O-ring is received and held in the notch or notches; then the O-ring is brought around the item to which it is to be removably secured (e.g. a rod or a portion of a reel) partially encircling it; and the O-ring is then brought over the line cutter so that a portion of the O-ring is tightened about the other side of the cutter. To accomplish this and to have a tight fit of the O-ring around the item and about the cutter, the O-ring should be somewhat elastic, but not so elastic that a loose fit results.

In conclusion, therefore, it is seen that the present invention and the embodiments disclosed herein are well adapted to carry out the objectives and obtain the ends set forth at the outset. Certain changes can be obviously made in the apparatus without departing from the spirit and the scope of this invention. The present invention is, therefore, well adapted to carry out the objects and obtain the ends and advantages mentioned, as well as others inherent therein. While there have been described various embodiments of the present invention, the apparatuses described are not intended to be understood as limiting the scope of the invention. It is realized that changes therein are possible and it is further intended that each element recited in any of the following claims is to be understood as referring to all equivalent elements for accomplishing substantially the same results in substantially the same or equivalent manner. It is intended to cover the invention broadly in whatever form its principles may be utilized.

What is claimed is:

1. A fishing reel comprising
a reel body,
a reeling mechanism on the reel body for reeling fishing line,
an exterior handle engaging the reeling mechanism for operating said mechanism, and
a fishing line cutter on the reel body, the fishing line cutter comprising
a body member,
a cutting member attached to the body member for cutting the fishing line, a portion of the cutting member exposed in an opening in the body member, the opening suitable for the entry therein of the fishing line so that the fishing line is movable to contact the cutting member,
at least one lip extending from the body member, the at least one lip partially blocking the opening.

2. A fishing reel comprising
a reel body,
a reeling mechanism on the reel body for reeling fishing line,
an exterior handle engaging the reeling mechanism for operating said mechanism, and
a fishing line cutter on the reel body, the fishing line cutter comprising
a body member mountable to a portion of the reel body, the body member having a base portion with two opposed sides and two ends,
a cutting member attached to the body member for cutting the fishing line, and
an O-ring for wrapping about one side of the base portion, around the portion of the reel body, and around the other side of the base portion to removably secure the fishing line cutter to the reel.

3. A fishing line cutter comprising
a body member mountable to another item,
a cutting member attached to the body member for cutting the fishing line, the cutting member exposed in a first recess in the body member, the first recess defined by portions of the body member and having a first opening and communicating with a second recess, the second recess having a second opening and disposed at an angle to the first recess and the second recess defined by a portion of the body member and by a lip, the lip extending from the body member and partially blocking the first opening of the first recess and inhibiting the inadvertent entry of the fishing line through the first opening into the recess.

4. A fishing rod comprising
an elongated rod member,
a fishing line cutter on the elongated rod member, the fishing line cutter comprising
a body member
a cutting member attached to the body member for cutting the fishing line, the cutting member exposed in a first recess in the body member, the first recess defined by portions of the body member and having a first opening and communicating with a second recess, the second recess having a second opening and disposed at an angle to the first recess and the second recess defined by a portion of the body member and by a lip, the lip extending from the body member and partially blocking the first opening of the first recess and inhibiting the inadvertent entry of the fishing line through the first opening into the recess.

5. The fishing rod of claim 4 including also a single O-ring for securing the fishing line cutter to the fishing rod, the lip inhibiting entry of the O-ring into the opening.

* * * * *